(12) United States Patent
Subburaj et al.

(10) Patent No.: US 12,730,186 B2
(45) Date of Patent: Sep. 8, 2026

(54) FFT RADAR SYSTEM

(71) Applicant: Texas Instruments Incorporated, Dallas, TX (US)

(72) Inventors: Karthik Subburaj, Bangalore (IN); Anil Mani, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 497 days.

(21) Appl. No.: 18/341,296

(22) Filed: Jun. 26, 2023

(65) Prior Publication Data

US 2024/0353528 A1 Oct. 24, 2024

(30) Foreign Application Priority Data

Apr. 20, 2023 (IN) ............................ 202341028630

(51) Int. Cl.
*G01S 7/35* (2006.01)
*G01S 7/288* (2006.01)
*G01S 7/40* (2006.01)

(52) U.S. Cl.
CPC ............ *G01S 7/356* (2021.05); *G01S 7/2883* (2021.05); *G01S 7/4056* (2013.01)

(58) Field of Classification Search
CPC ....... G01S 7/356; G01S 7/2883; G01S 7/4056
See application file for complete search history.

(56) References Cited

U.S. PATENT DOCUMENTS 10,330,773 B2 6/2019 Rao et al.
11,137,476 B2 10/2021 Ginsburg et al.

FOREIGN PATENT DOCUMENTS

ES 2198954 T3 * 2/2004
JP 2016109678 A * 6/2016

* cited by examiner

*Primary Examiner* — Resha Desai
*Assistant Examiner* — Helena H Seraydaryan
(74) *Attorney, Agent, or Firm* — Michael T. Gabrik; Frank D. Cimino

(57) ABSTRACT

Signal processing comprising, first, determining a plurality of fast Fourier transform (FFT) values corresponding to each sample in a plurality of signal samples, second, variably compressing ones of the FFT values at different non-zero levels of compression, and third, storing the variably compressed ones of the FFT values.

20 Claims, 7 Drawing Sheets

500A
VC1
VC2
VC3
VC4
VC5
VC6
VC7
VC8
HANN
BLACKMAN
504
502
dB
0
-10
-20
-30
-40
-50
-60
-70
-80
-90
0 8 16 32 50 64 100 128 150 192 200 224 240 248 250 256 300
CHIRP INDEX

FFT RADAR SYSTEM

CROSS-REFERENCE TO RELATED APPLICATION

This application claims the benefit of and priority to India Provisional Application No. 202341028630, filed Apr. 20, 2023, which is incorporated herein by reference.

TECHNICAL FIELD

This application relates generally to radar systems in which windowed fast Fourier transform (FFT) compression is applied, for example in frequency modulated continuous wave (FMCW) radar systems.

BACKGROUND

An FMCW radar transmits an electromagnetic radiation (EMR) signal or tone with a known frequency that is periodically and linearly modulated to vary up and down over time, where the collective signal over which the frequency is swept is sometimes referred to as a chirp. A set of these chirps can form a frame and can be used as the observation window for radar processing. As the radar transmits chirps, it also receives and collects multiple samples of a received signal from plural modulated chirps, where the received signal is for example reflected from a detected object, corresponding to the transmitted signal. Some or all of this data is often stored by the radar, which can be resource intensive and increase costs. In some instances, for example to reduce storage requirements, the data is compressed with some level of corresponding degradation in signal-to-noise ratio (SNR). The radar later processes the received and stored signal samples to estimate one or more of presence, distance, speed, and direction of movement of objects within a detection distance limit of the radar. These systems have numerous uses, for example becoming increasingly popular for automotive and industrial applications.

Examples are described that may improve on the above considerations.

SUMMARY

In described examples, a method of signal processing comprises, first, determining a plurality of FFT values corresponding to each sample in a plurality of signal samples, second, variably compressing ones of the FFT values at different non-zero levels of compression, and third, storing the variably compressed ones of the FFT values.

Other aspects are also described and claimed.

DETAILED DESCRIPTION

Figure 1:
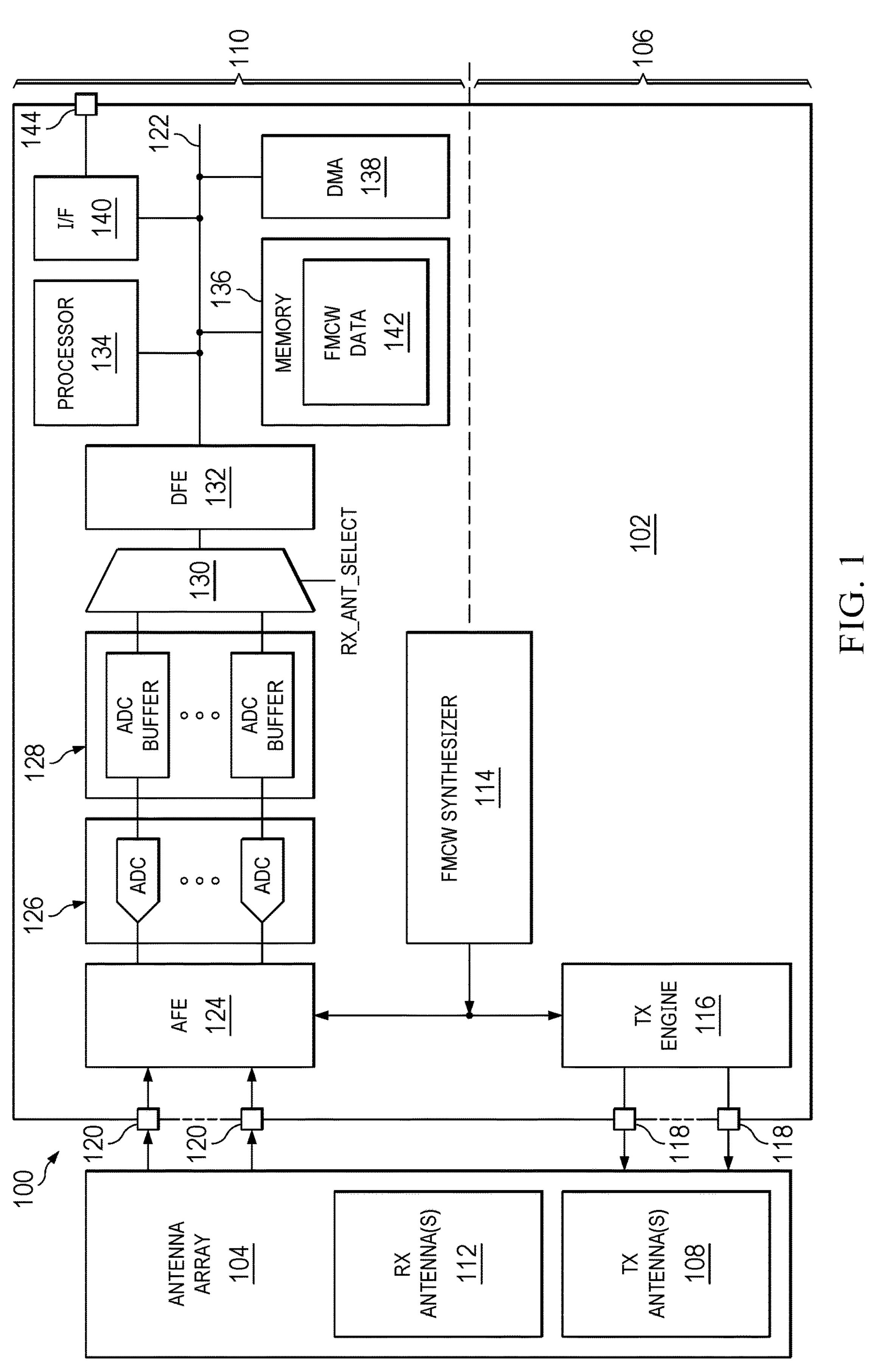
FIG. 1 is an electrical diagram of a FMCW radar system 100.

Examples include a FMCW radar system 100, for example as shown in an electrical diagram in FIG. 1. The FMCW radar system 100 can transmit successive modulated signals (chirps) and receive and detect reflection signals from objects within range of the transmitted chirps. The FMCW radar system 100 performs operations such as fast Fourier transforms (FFTs) on the received signals, including first range FFTs and second Doppler FFTs. The range FFT data may be compressed and stored, and later retrieved and decompressed after which Doppler FFTs are performed on range FFTs corresponding to multiple chirps. Compression of the range FFT data may be variable, and can provide benefits, for example including any one or more of lower storage requirements and improved SNR.

The FMCW radar system 100 includes a transceiver 102 coupled to an antenna array 104. The transceiver 102 may be implemented in various forms, for example by one or more integrated circuits (ICs), or integrated solely into one circuit, such as in the form of a system on a chip (SOC). Further, such an SOC may be combined with, or separate from, the antenna array 104. The transceiver 102 includes a transmit (TX) path 106 coupled to one or more TX antennas 108 in the antenna array 104, and the transceiver 102 includes a receive (RX) path 110 coupled to one or more RX antennas 112 in the antenna array 104. The transceiver 102 also includes an FMCW synthesizer circuit 114, for example including a local oscillator that includes a phase locked loop (PLL) with a voltage-controlled oscillator (VCO). The FMCW synthesizer circuit 114 may couple to both the TX path 106 and the RX path 110.

The TX path 106 includes a TX engine circuit 116 and one or more output conductors (e.g., pins) 118. The TX engine circuit 116 is coupled to receive a signal-generation input signal from the FMCW synthesizer circuit 114. In response to the signal-generation input signal, the TX engine circuit 116 outputs a modulated signal, for example in the form of a chirp, to each of the output conductors 118. In this regard, the TX engine circuit 116 may include various components, for example a clock multiplier, for generating the modulated signal. Each of the output conductors 118 is coupled to a respective antenna in the TX antennas 108, so as to transmit the chirp, either directionally or unidirectionally, for example to reflect off any object within range of the FMCW radar system 100.

The RX path 110 includes one or more input conductors (e.g., pins) 120, coupled through various analog and analog-to-digital circuitry, and ultimately to a transceiver bus 122 from which FMCW data processing may occur.

In more detail of the illustrated components illustrated in FIG. 1 to the left of the transceiver bus 122, the one or input conductors 120 are coupled to receive radio frequency (RF) signals from the one or more RX antennas 112, which are then coupled to an analog front end circuit (AFE) 124. The AFE 124 may include any one or more of various circuits for processing the received signal, for example with signal mixers that mix the received signal with the output of the FMCW synthesizer 114, amplifiers, filters, and the like. More particularly, the AFE 124 may mix a received signal with a previously-transmitted signal by the TX engine circuit 116, creating a resultant signal referred to as an intermediate frequency (IF) signal. Because the received signal is a time domain replica of the transmitted chirp, then the IF signal will include a frequency domain component with a frequency proportional to the distance between the system 100 and the object from which the received signal was reflected. The IF signal is only detectable while both the transmitted and corresponding reflected received replica are present. Where there are multiple objects reflecting the transmitted signal, the IF signal will have tones corresponding to each reflection, that is, each with a respective frequency corresponding to the range of the reflecting object from the FMCW radar system 100.

An output of the AFE 124 is coupled to an analog-to-digital converter (ADC) circuit 126, which may include one or plural ADCs. For example, the ADC circuit 126 may include one ADC per each antenna in the RX antennas 112, so that each ADC converts a data stream corresponding to a respective RX antenna. The ADC circuit 126 output(s) is/are coupled to an ADC buffer circuit 128, which may include a corresponding number of individual ADC buffers, each for temporarily storing a digital output stream of successive values provided from a respective ADC in the ADC circuit 126. The ADC buffer circuit 128 output(s) is/are coupled to respective inputs of a multiplexer (MUX) 130. The MUX 130 includes a selection input coupled to receive a selection signal, RX_ANT_SELECT, which can be asserted to cause the MUX 130 to select digital data from any one of the ADCs in the ADC circuit 126, thereby providing selectability of each analog RF signal received by a respective one of the antennas in the RX antennas 112. The output of the MUX 130 is coupled to a digital front end (DFE) circuit 132. The DFE 132, which also may be referred to as the digital baseband, may include may include any one or more of various circuits for to perform decimation filtering on the digital signals to reduce the data transfer rate, DC offset removal, and digital compensation of non-idealities in the receive channels. The output of the DFE 132 is coupled to the transceiver bus 122.

In more detail of the illustrated example with circuits coupled to the transceiver bus 122, such circuits may include a processor 134, a memory 136, a direct memory access (DMA) unit 138, and an external interface (I/F) 140. The processor 134 may be a general purpose processor, an application specific processor, a digital signal processor, controller or the like, and may be included on an SOC or as a separate IC. Indeed, certain aspects of described examples may prove even more beneficial where the processor is integrated (e.g., by SOC) with other devices, as memory constraints may arise from such integration, in which case efficiencies achieved by compression described herein is of even greater value. The processor 134 includes circuitry to accomplish various FMCW operations, where such circuitry may include hardware and/or software, for example with the software provided in a computer readable storage that may be internal or external relative to the processor 134, where such external memory may be included in the memory 136. The memory 136 may include one or more types of storage and one or more levels of cache memory. An FMCW data storage area 142 is included in the memory 136, for example for storing FMCW-related data as it is processed by the processor 134. As detailed below, such FMCW-related data may include range FFT data and Doppler FFT data, where for example the range FFT data is compressed and stored into the FMCW data storage area 142, after which the compressed data is subsequently retrieved, decompressed, and further processed to determine the Doppler FFT data. The DMA unit 138 may assist with data transfer to/from the memory 136. The I/F 140 is coupled to an I/O conductor 144 (e.g., pin), through which data, including control, may be communicated to or from the transceiver bus 122, and external from the transceiver 102.

Figure 2:
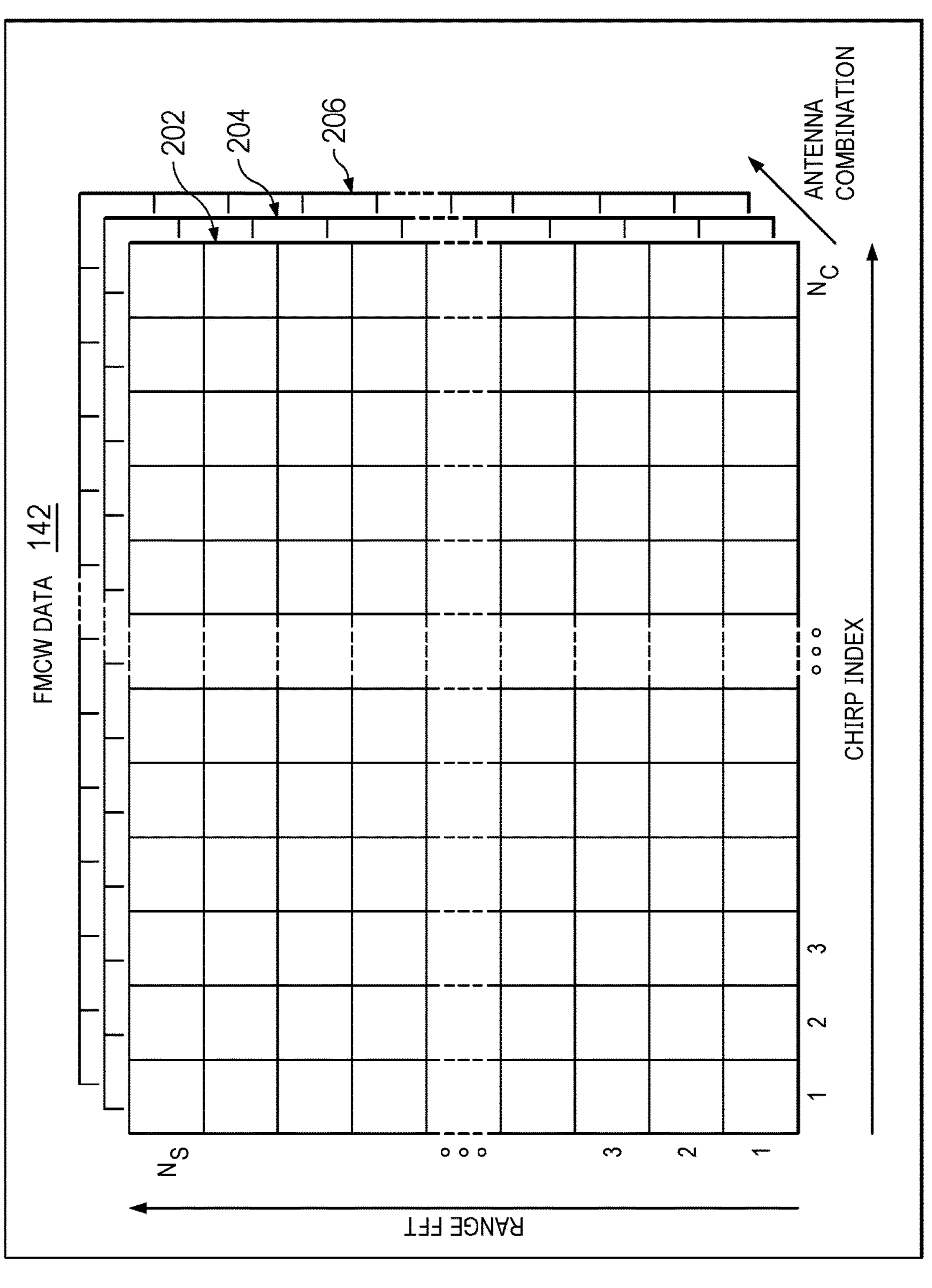
FIG. 2 is a diagrammatic view of the FIG. 1 FMCW data storage area 142.

FIG. 2 is a diagrammatic view of the FIG. 1 FMCW data storage area 142, shown in more detail as a three-dimensional (3D) data cube 200. The 3D data cube 200 includes plural data planes, where by example three such data planes 202, 204, and 206 are shown. Each data plane 202, 204, and 206 corresponds to FFT determinations from a unique combination of one antenna from the TX antennas 108 and one antenna from the RX antennas 112. Accordingly, if there are an integer number X of the TX antennas 108 and an integer number Y of the RX antennas 112, then the data cube 200 includes a total of the product, X×Y, of data planes. For each data plane, the horizontal axis indicates a chirp index, that is, an identifier of a single chirp corresponding to the vertical column for that chirp. In the illustrated example, there are a total $N_C$ chirps, labeled as chirp 1 through chirp $N_C$. Relatedly for each data plane, the vertical axis indicates a number of data samples received and processed by the transceiver 102, for the chirp indexed in the vertical dimension. In the illustrated example, there are a total $N_S$ samples, labeled as sample 1 through sample $N_S$. For example, for chirp index 1, a total of $N_S$ samples are taken, for example as an analog time-domain measure then converted to a real digital number, and then an FFT is performed to provide a corresponding frequency-domain complex number. The FFT determination is stored in a corresponding location in the data cube 200. Accordingly, for chirp index 1, a sample of the sample index 1 is taken of the IF signal corresponding to the appropriate pairing of one TX and RX antenna of the applicable data plane 202, 204, or 206, the sample is digitized and an FFT is performed on it, and the result is stored into the mapped location, sometimes referred to as a bin, for the chirp index 1 and the sample index 1. For a given chirp (e.g., chirp index 1), this process repeats for each of the $N_S$ samples, thereby filling each bin illustrated as a vertical column (or vector) element in the data cube 142. This process repeats for each other chirp index 2, 3, . . . $N_C$, thereby completing the data cube 142. As detailed later, data may be further processed in connection with these steps, including forms of filtering, compression, and subsequent analyses of the data to determine velocity (Doppler) information, and potentially angle of incidence.

Figure 3:
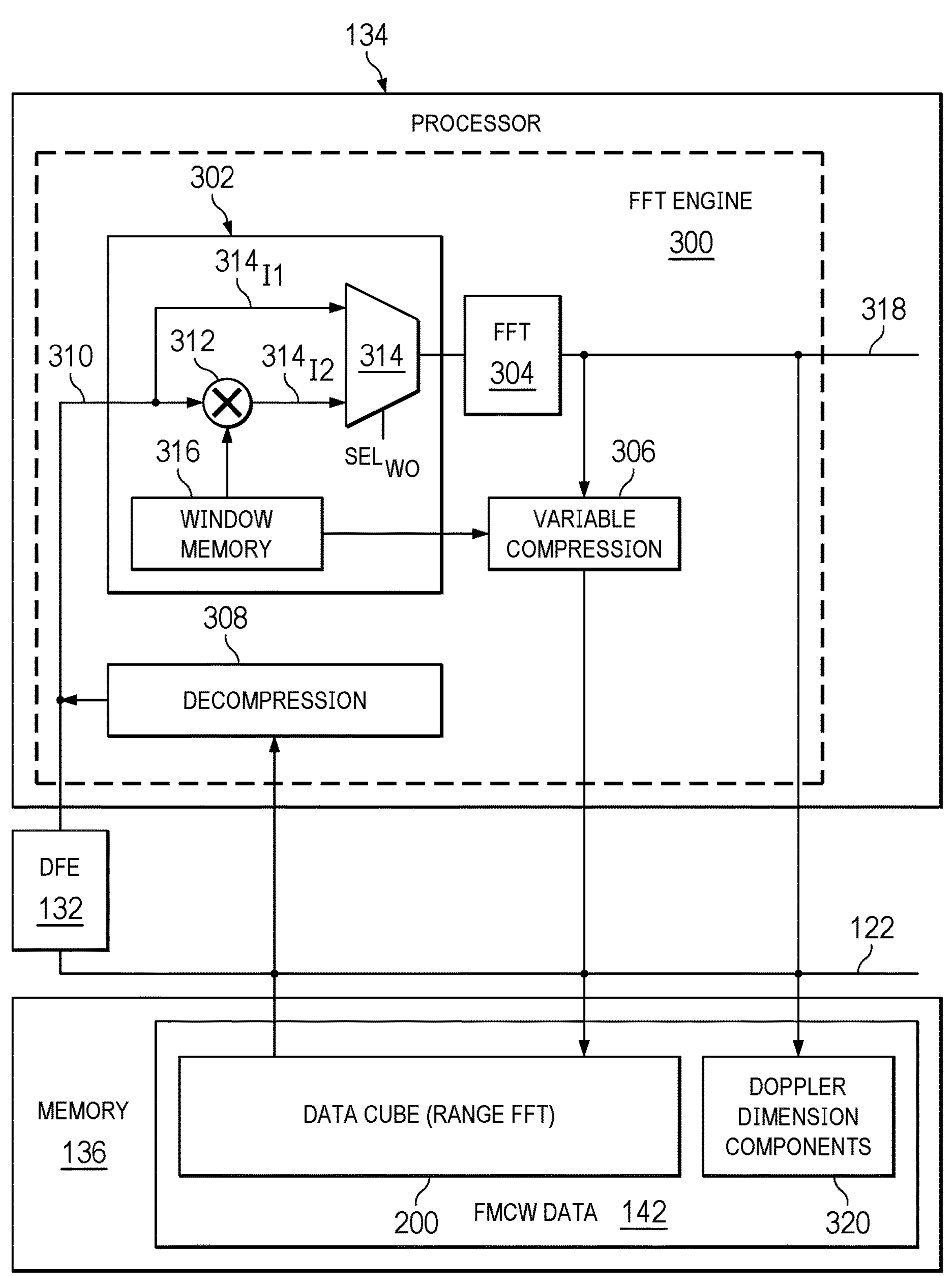
FIG. 3 is an electrical diagram of certain FIG. 1 circuits in greater detail, including the processor 134 and the memory 136.

FIG. 3 is an electrical diagram of certain FIG. 1 circuits in greater detail, including the processor 134 and the memory 136.

Within the processor 134, there is an FFT engine circuit 300. The FFT engine circuit 300 includes a windowing circuit 302, an FFT determination circuit 304, a variable compression circuit 306, and a decompression circuit 308. The transceiver bus 122 is coupled to an input 310 of the windowing circuit 302, so that data from the transceiver bus 122 may be processed by the windowing circuit 302 to optionally apply a window to such data. The input 310 is coupled to a first input of a multiplier 312 and to a first input $\mathbf{314}_{11}$ of a MUX 314. A second input of the multiplier 312 is coupled to an output of a window memory 316. The window memory 316 stores information, such as window coefficients, that may be output to the multiplier 312 so as to apply the window to data received at the input 310. For example, window coefficients may to implement one of various types of window, such as a Hann or Blackman window, which may cover both Doppler and range windowing, although different windows also may be used. The output of the multiplier 312 is coupled to a second input $314_{12}$ of the MUX 314. The output of the MUX 314 is controlled by a window option select signal, $SEL_{WO}$, to select either of the inputs to the MUX 314 and output the selected input to the FFT determination circuit 304. Accordingly, if $SEL_{WO}$ selects the first input 314*n*, then windowing is bypassed as the input 310 is thereby coupled to the output of the MUX 314, whereas if $SEL_{WO}$ selects the second input $314_{12}$, then filtering is applied by the combination of the multiplier 312 and the window memory 316. The FFT determination circuit 304 may be a dedicated architecture for determining FFTs, for example by either hardware or a combination of hardware and software, for example with the software provided in a computer readable storage. Accordingly, and as also detailed later, the FFT determination circuit 304 performs FFTs on digital input values to provide a corresponding frequency-domain complex number. The output of the FFT determination circuit 304 is coupled to a processor bus 318. The processor bus 318 is coupled to a first input of the variable compression circuit 306. The window memory 316 is also coupled to a second input of the variable compression circuit 306. The variable compression circuit 306 is operable to compress data (both real and imaginary parts) received from the processor bus 318, and as also detailed later, with the extent of compression being responsive to information from the window memory 316. Generally, the compression reduces the bit-resolution data from a value $B_O$ with an integer O number of bits, to a value $B_L$ with a number L of bits less than O. Additionally as detailed later, the type and/or amount of compression implemented by the variable compression circuit 306 is variable, so that different outputs may have differing levels of non-zero compression. The output of the variable compression circuit 306 is coupled to the transceiver bus 122. The processor bus 318 is also coupled to the transceiver bus 122, and the processor bus 318 may be coupled to other items within the processor 134 (not shown). The transceiver bus 122 is also coupled to an input of the decompression circuit 308, which has an output coupled to the input 310. The decompression circuit 308 can approximately reverse compression imposed on data by the variable compression circuit 306.

Within the memory 136, the transceiver bus 122 is coupled as an input to the FMCW data storage area 142 and, more particularly, to store the FFT determinations into the FIG. 2 described data cube 200. In more detail, as such FFT determined data are stored to the data cube 200, the data cube data in the vertical dimension (per chirp index) represents range FFT data, that is, data indicative of the distance between the TX antenna and the object that reflected the signal that was processed to determine the range FFT data. Further, this range FFT data is variably compressed by the variable compression circuit 306 prior to storage in to the data cube 200. The output of the data cube 200 is coupled to the transceiver bus 122, from where it may be coupled to the decompression circuit 308, for example to decompress range data previously compressed by the variable compression circuit 306.

The FMCW data storage area 142 also includes a Doppler dimension components circuit 320, which has an input also coupled to the transceiver bus 122. Particularly, after a data plane 202, 204, 206 (see FIG. 2) in the data cube 200 is populated with variably compressed range FFT data, such data may be read to the transceiver bus 122, decompressed by the decompression circuit 308, windowing by the windowing circuit 302, and a next FFT may be performed by the FFT determination circuit 304, now in the Doppler dimension. The Doppler dimension is orthogonal to the range dimension, that is, the Doppler dimension is across all chirp indices for a single sample index. To store these Doppler FFT determinations, the output of the FFT determination circuit 304 also may be coupled, via the processor bus 318, to the Doppler dimension components circuit 320.

Lastly, the FIG. 3 illustration of FFT-related data in the memory 136, separate from the processor 134, is by way of example. In an alternative example, such memory may be included within the processor 134 (e.g., in a cache or other internal memory).

Figure 4:
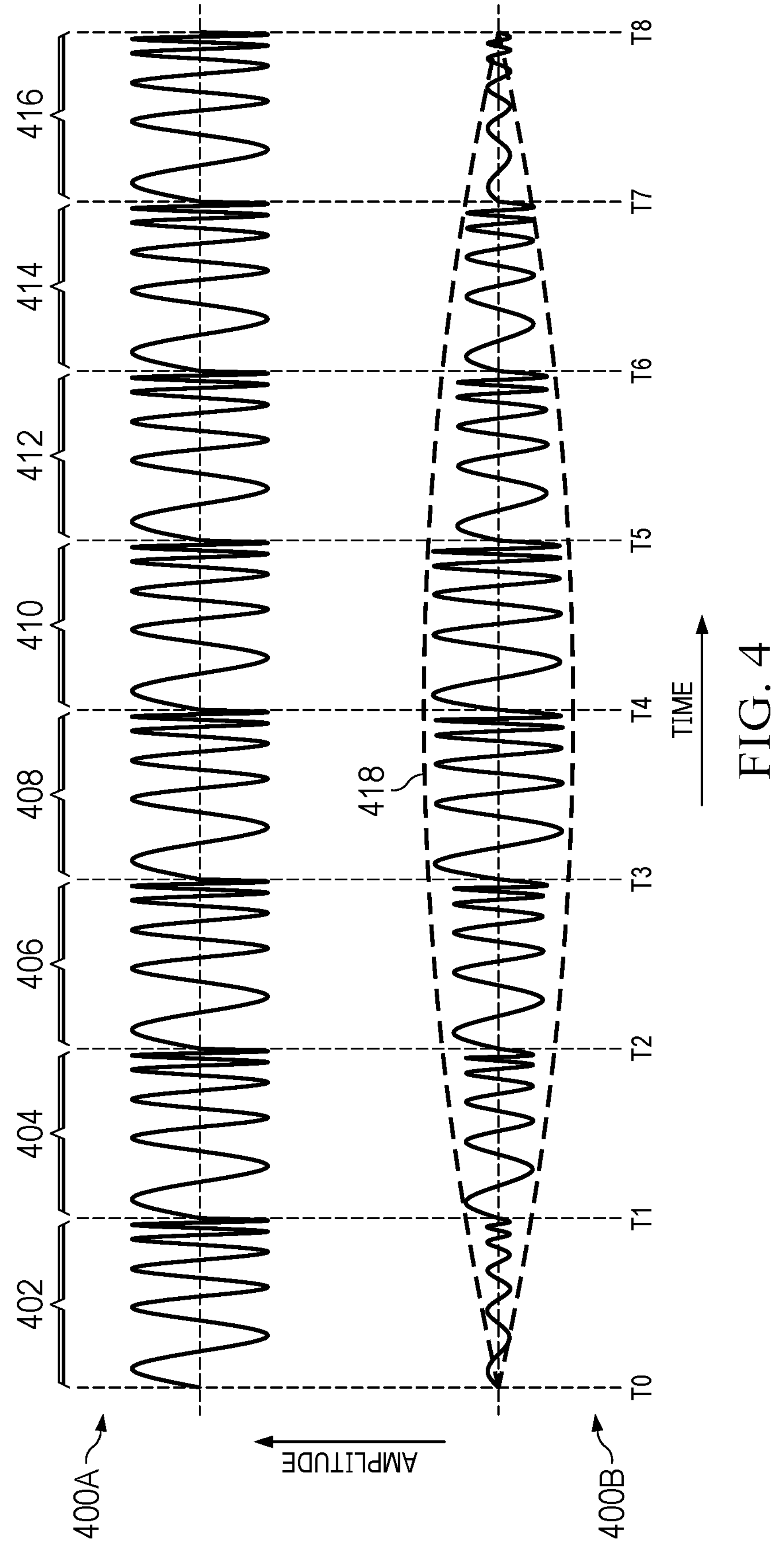
FIG. 4 illustrates a first signal diagram 400A and a second signal diagram 400B

FIG. 4 illustrates a first signal diagram 400A and a second signal diagram 400B, for purposes of further describing chirp signals and windowing of samples corresponding to the chirp signals. In each of the first and second signal diagrams 400A and 400B, the horizontal axis illustrates time and the vertical axis illustrates amplitude.

In the first signal diagram 400A, at a time TO, a first chirp signal 402, in the form of a sinusoid, commences at a first frequency. The first chirp signal 402 may represent a signal received by the FMCW radar system 100, for example as a reflection from on object of a transmitted signal from the same system 100. A frequency of the first chirp signal 402 increases linearly from the time T0 to a time T1, at which time the first chirp signal 402 ends, having a bandwidth from the frequency at T0 to the frequency at T1. The first signal diagram 400A further illustrates seven additional chirp signals, evenly-numbered 404 through 416, respectively, and each during a respective time period equal to that of the first chirp signal 402, for a total of eight chirp signals. The example of eight chirp signals is for simplification purposes, when in reality an entire stream of chirp signals (the frame) may span any number of chirps, typically as a factor of two (e.g., 256 chirp signals).

The second signal diagram 400B again illustrates the eight chirp signals, evenly numbered 402 through 416. However, in the second signal diagram 400B, the amplitude of each chirp signal is modified by the effects of a window, shown by a parabolic envelope 418. Such an operation is known in the art, and may be achieved through various different types of windows. Generally, windowing is used to improve signal non-idealities. Particularly, ideal FFT assumes the sampled time domain signal is infinitely repetitive, which in real world application is often not the case. Instead, real world signals typically have a finite number of sampled points, called a record, and FFT copies and repeats them—if the signal is truly periodic and sampled synchronously to the period (e.g., the time domain sampling is an integer of the input frequency), there may be a smooth continuation from one record to the next. In practice, however, the signal, or the sampling of it, is not likely to be synchronized with the received signal periodicity. Accordingly, the step from one record to the next, in a non-repeating signal, creates a discontinuity. This discontinuity creates signal leakage, the effects of which windowing attempts to reduce by forcing the time domain toward zero, for example at times T0 and T8, as imposed by the envelope 418. Accordingly, the envelope 418 modifies the amplitude of signals received, corresponding to the transmitted chirps 402 through 416, and thereby provides more fluid transition from one record to the next given the decreasing and diminished amplitude at the end of one record, followed by the diminished but then increasing amplitude of the next successive record.

Returning to FIG. 3, the window memory 316, multiplier 312, MUX 314, and FFT determination circuit 304 may apply the FIG. 4 windowing to a data stream at the input 310.

For example, the window memory 316 may store coefficients that impart a greater signal amplitude attenuation at and near the beginning and end of the FIG. 4 envelope 418 (toward T0 and T8), as compared to the lesser signal amplitude attenuation toward the middle of the envelope 418. The window memory 316 may provide each such coefficient to the multiplier 312, which multiples the coefficient times the digital value of a sample, providing the product, via the MUX 314, to the FFT determination circuit 304. The above-described windowing may be applied for different FFT sequences. As a first example, as the FIG. 2 data cube 200 is filled with range FFT values in the per chirp dimension (shown vertically in FIG. 2), the range signal samples may be windowed per coefficients in the window memory 316. As a second example, as the FIG. 2 data cube is processed for Doppler FFT determines in the per sample dimension (shown horizontally in FIG. 2), the Doppler signal samples also may be windowed per coefficients in the window memory 316.

Figure 5A:
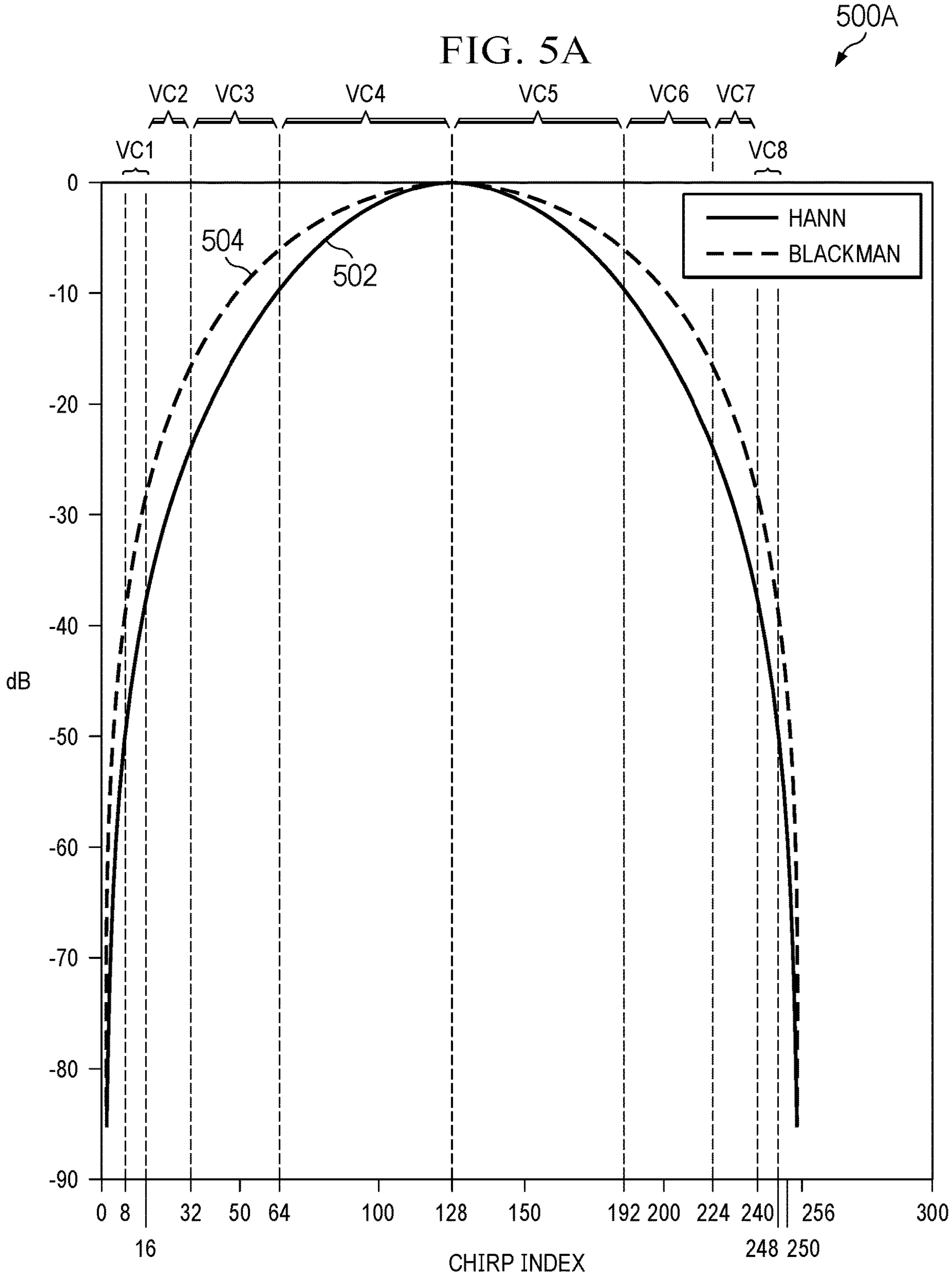
FIG. 5A illustrates a set of signal plots 500A depicting digital data, for example from the FIG. 3 DFE circuit 132.

FIG. 5A illustrates a set of signal plots 500A depicting digital data, for example from the FIG. 3 DFE circuit 132, as attenuated by Doppler windowing which may be achieved, in part, by coefficient from the window memory 316. The signal plots 500A include a first plot 502 corresponding to a Hann window and a second plot 504 corresponding to a Blackman window. In FIG. 5A, the horizontal axis illustrates a chirp index, for example in a sequence of 256 chirps, numbered 1 through 256. The vertical axis illustrates dB, that is, the amount of signal attenuation imposed by the one of the two different illustrated windowing techniques, corresponding to either the first plot 502 or the second plot 504. For example in the second plot 504, a set of Blackman window memory coefficients (from the window memory 316) is applied to signals corresponding to the chirp index 8 through 16, causing a signal attenuation loss between −28 dB and −40 dB. As another example in the second plot 504, a set of Blackman window memory coefficients is applied to signals corresponding to the chirp index 16 through 32, causing a lower signal attenuation as compared to that for the chirp index 8 through 16, namely, providing loss between −28 dB and −16 dB. As a third and related example in the second plot 504, the Blackman windowing coefficients attenuate the received signs corresponding to the chirp index 32 through 64 to an even lesser extent, for example by a signal loss between −16 dB and −6 dB. The decreased signal attention increases as the chirp index approaches the middle of the entirety of 256 chirp signals. FIG. 5A also illustrates a symmetry about a vertical center axis (at or near chirp 128), so that that signal attenuation begins to increase toward higher chirp indices following chirp index 128, so that the attenuation decrease from the chirp index 0 upward toward the chirp index 128 is mirrored from the chirp index 256 downward toward the chirp index 128.

FIG. 5A also illustrates, in connection with its horizontal axis, different variable compression levels, shown as VC1, VC2, VC3, and VC4. Each of these compression levels represents a different amount of compression imposed by the FIG. 3 variable compression circuit 306, on the range FFT values before they are stored to the data cube 202. Particularly, the preceding has described that the FMCW radar system 100 first determines and stores a first set of range FFT values in a first data dimension, and it subsequently retrieves those values from storage and, from them, it second determines a second set of Doppler FFT values in a different data dimension. Further, as the second set of Doppler FFT values are determined, a Doppler windowing is applied, which attenuates the range FFT values in the second dimension (e.g., according to chirp index). The second dimension attenuation is greater toward the beginning or end of the dimension, for example with respect to chirps, the signals near the beginning and end of the chirp frame are more attenuated as compared to those range FFT values toward the middle of the same frame. The FIG. 5A compression levels, VC1 through VC4, are intended to illustrate that the range FFT data variable compression is commensurately adjusted in anticipation of the subsequent Doppler attenuation. For example, the compression level VC1 is shown to apply for a first number of chirps, for example shown as chirps 8 through 16. Further, the plots 502 and 504 depict that the range FFT values for those chirps 8 through 16 will receive a first amount of signal attenuation, which is relatively large, when Doppler FFT values are determined from those range FFT values. Commensurately, therefore, the variable compression level VC1 represents that as the range value FFTs are determined for chirps 8 through 16, then a first and relatively large amount of signal compression is applied by the variable compression circuit 306 to those range FFT values. As another example, the variable compression level VC2 is shown to apply for a second number of chirps, for example as chirps 17 through 32. Further, the plots 502 and 504 depict that the range signal values for those chirps 17 through 32 will receive a second amount of signal attenuation, less than that corresponding to chirps 8 through 16, when Doppler FFT values are determined. Commensurately, therefore, the variable compression level VC2 represents that as the range value FFTs are determined for chirps 17 through 32, then a second still relatively large amount of signal compression is applied by the variable compression circuit 306 to those range FFT values, but the second relatively large amount for VC2 will be less than VC1, but still greater than other variable compression levels VC3 and VC4. The variable compression examples continue for VC3 (e.g., chirps 33 through 64), which imposes less compression than VC1 or VC2, but still more than VC4. Lastly, VC4 (e.g., chirps 65 through 128) imposes the least amount of compression as compared to VC1 through VC3, but which still may be greater than zero compression. Indeed, as example numbers, the variable compression VC4 can still impose ample compression, for example at 25%, while VC3 imposes 37.5% compression, VC2 imposes 50% compression, and VC1 imposes 75% compression. Lastly, FIG. 5A further illustrates four additional compression levels, VC5 through VC8, representing mirror images, about the vertical center of the plots, in terms of chirp index, of variable compression levels VC4 through VC1, respectively. Accordingly, VC5 compresses at the same level as VC4, VC6 compresses at the same level as VC3, VC7 compresses at the same level as VC2, and VC8 compresses at the same level as VC1.

Figure 5B:
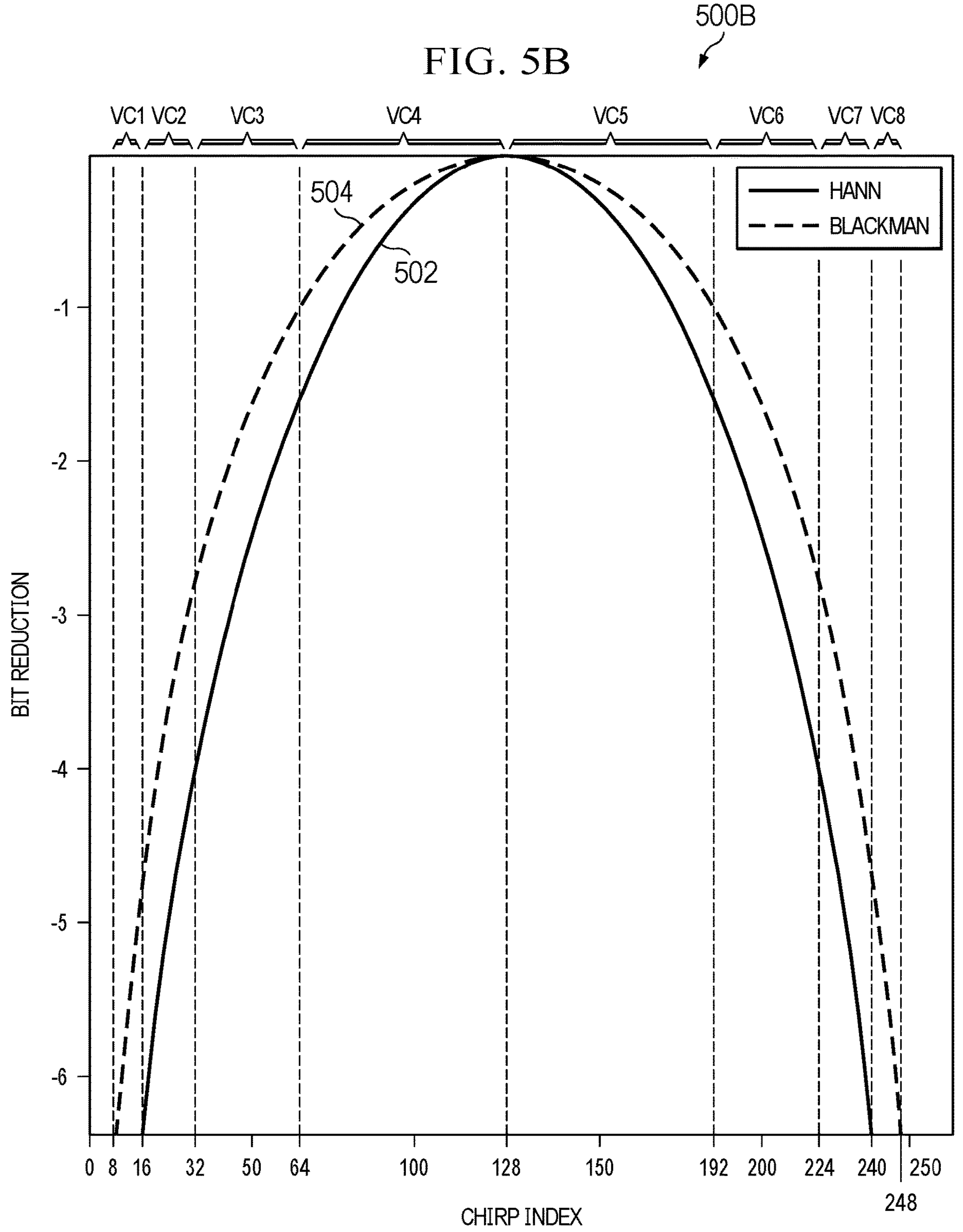
FIG. 5B illustrates a set of signal plots 500B, corresponding to the FIG. 5A signal plots 500A.

FIG. 5B illustrates a set of signal plots 500B, corresponding to a logarithmic scale of the FIG. 5A signal plots 500A. In FIG. 5B, however, the vertical axis depicts an average amount of bit reduction achieved by the compression, that is, in quantifying the variable bit reduction of storing a compressed value with fewer bits than would be necessary to store all range FFT values at a same fixed compression value, such as at a 25% compressed bit resolution as compared to original size. As a first example shown for the first plot 502, if the variable compression VC1 imposes a 75% compression, then across the total number of range FFT values stored, for chirp indices 8 through 16, somewhere from 5 to 6 (or more) bits are saved for each stored value, as compared to the number of bits to store a range FFT value stored for the chirp index 128. As a second example shown for the first plot 502, if the variable compression VC2 imposes a 50% compression, then across the total number of range FFT values stored, for chirp indices 17 through 32, somewhere from 2.8 to 5 bits are saved for each stored value, as compared to the number of bits to store a range FFT value stored for the chirp index 128. Other examples for the first plot 502, or similarly for the second plot 504, are discernable from the signal plots 500B.

Table 1 below summarizes the FIG. 5B bit reduction, taking into account all the illustrated chirps, and for the two different types of windowing.

TABLE 1

| Average bit reduction in different variable compression groups | Hann | Blackman |
|---|---|---|
| VC1 (chirp index 8 to 16) | 5.6 | 7.3 |
| VC2 (chirp index 17 to 32) | 3.6 | 5.0 |
| VC3 (chirp index 33 to 64) | 1.8 | 2.7 |
| VC4 (chirp index 65 to 128) | 0.3 | 0.5 |
| Overall, index 8 to 128 | 1.5 | 2.2 |

From the preceding and Table 1, range FFT values corresponding to chirps that will be at or near the edge of the subsequent Doppler windowing envelope are more highly compressed prior to the storage of those compressed values, as compared to range FFT values more centered in the window envelope. As a result, fewer total bits are stored, and the size of storage, and its associated cost, may be reduced by approximately 20%, for example improving efficiency as compared to achieving a same SNR by some other alternative prior solution. Further or alternatively, the variable compression de-emphasizes the impact of higher-window-attenuated edge-chirp signals in the final signal detection, thereby improving overall SNR with a technique that does not require higher power, as is often required to improve SNR.

Figure 6:
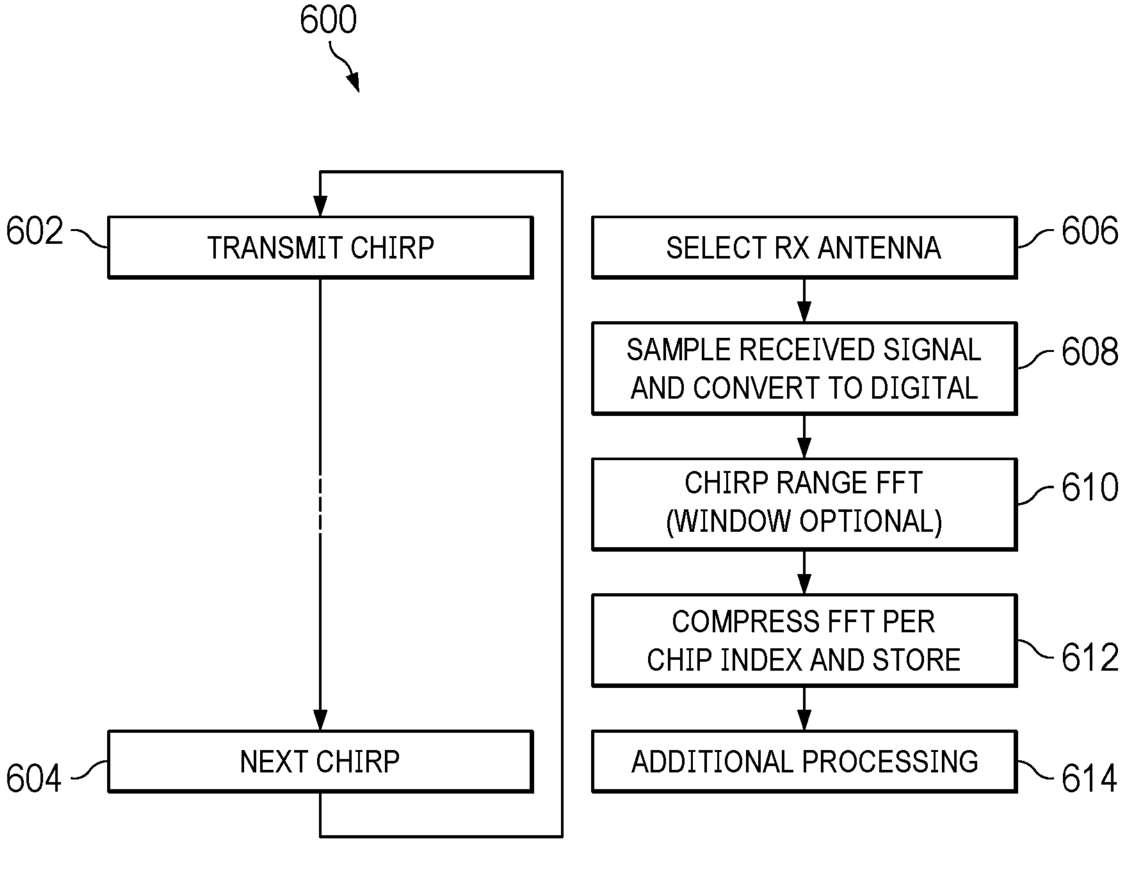
FIG. 6 is a flowchart of a method 600 summarizing various operational steps of the FIG. 1 FMCW radar system 100.

FIG. 6 is a flowchart of a method 600 summarizing various operational steps of the FIG. 1 FMCW radar system 100. Steps to the left in the method 600 correspond to the FIG. 1 TX path 106, and steps to the right in the method 600 correspond to the FIG. 1 RX path 110.

The TX related steps in method 600 include a transmit chirp step 602 and a next chirp step 604. The step 602 transmits a chirp signal from an antenna in the TX antenna (s) 108, for example by operation of the TX engine circuit 116. Next in a step 604, a delay is added, after which flow returns to a next incidence of the step 602 to transmit a next chirp. However, the steps 602 and 604 are spaced apart sufficiently in time, implied in the FIG. 6 vertical dimension, so that reflecting chirp signals, from any object(s) within range of the FMCW radar system 100, may be processed by method 600 steps corresponding to the FIG. 1 RX path 110.

The RX related steps in the method 600 process reflected chirp signaling received at a RX antenna(s) 108. Accordingly, a step 606 selects the signal from one of the RX antenna(s) 108, as may be achieved early in the signal flow such as by AFE circuit 124, or later in the flow by assertion of RX_ANT_SELECT to the MUX 130, thereby selecting a digitized data stream from the selected antenna and coupling it to the transceiver bus 122. Accordingly, as part of the selection, at some point and as shown in a step 608, the selected signal is sampled and digitized, for example by the ADC circuit 126. Next, in a step 608, a range FFT is performed on the digital values, for example by the FFT determination circuit 304, and with those samples optionally windowed, windowing circuit 302, before the range FFT. Next, in a step 610, the FFT range values are variably compressed, that is, different levels of non-zero data compression are applied to different ones of the FFT range values across a same frame, and the variably-compressed values are stored to memory. Such compression may be applied by the variable compression circuit 306, which may select the compression amount among different non-zero levels, for example in response to an amount of windowing that will be subsequently applied to the range FFT values in a later additional data processing step. One example of the subsequently applied windowing may be in Doppler FFT processing, with the amount of windowing indicated by coefficients in the window memory 316 and corresponding to chirp index. In a step 612, the step 610 stored, and variably compressed, data is decompressed and processed in a different dimension. In one example, this additional processing involves windowing the decompressed data, according to the same window application used to inform the variable compression in the step 610. For example, the step 612 decompression may be achieved by the decompression circuit 308, the step 612 windowing by the windowing circuit 302, and the step 612 processing by the FFT determination circuit 304, in the sample dimension across multiple chirps. Additional processing may occur thereafter as shown in step 614, as will be ascertainable by one skilled in the art.

From the above, examples provide a method and/or apparatus related to frequency modulated transceivers, such as an FMCW radar. Either or both may provide one or more advantages. Additionally, modifications are possible in the described examples, and other examples are possible within the scope of the claims.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

What is claimed is:

1. A method of signal processing, comprising:

receiving a set of signal samples;

performing a fast Fourier transform (FFT) operation on the set of signal samples to determine a set of FFT values;

variably compressing ones of the FFT values at different levels of compression;

storing the variably compressed ones of the FFT values;

decompressing the variably compressed ones of the FFT values; and applying windowing to a frame of the decompressed variably compressed ones of the FFT values;

wherein the variably compressing is responsive to an amount of signal attenuation provided by the windowing.

2. The method of claim 1 and further including, prior to the first step:

transmitting a frequency modulated signal;

detecting a received signal; and sampling the received signal to produce the set of signal samples.

3. The method of claim 2 wherein the frequency modulated signal includes an FMCW radar signal.

4. The method of claim 2 wherein the determining step determines the plurality of FFT values corresponding to a respective digitized value for each sample in a plurality of signal samples from the received signal.

5. The method of claim 1, wherein the windowing is selected from a group including a Hann and Blackman windowing.

6. The method of claim 1, wherein the determining step includes determining a plurality of range FFT values.

7. The method of claim 6, wherein the applying windowing produces selectively attenuated range FFT values, and further including, sixth, determining a plurality of velocity FFT values in response to the selectively attenuated range FFT values.

8. The method of claim 1 and further including:

receiving a set of signals associated with radar values; and sampling the set of signals to produce the plurality of signal samples.

9. The method of claim 1, wherein the different levels of compression include at least four distinct compression levels, each corresponding to a different range of signal attenuation values.

10. The method of claim 1, wherein the different levels of compression include:

a first level of compression of a first percentage for FFT values corresponding to a signal attenuation within a first range;

a second level of compression of a second percentage for FFT values corresponding to a signal attenuation within a second range; and a third level of compression of a third percentage for FFT values corresponding to a signal attenuation within a third range.

11. A system, comprising:

fast Fourier transfer (FFT) determining circuitry adapted to produce a plurality of FFT values in response to the plurality of digital samples;

data compression circuitry coupled to the FFT determining circuitry and adapted to variably compress ones of the FFT values at different levels of compression;

data decompression circuitry adapted to decompress the variably compressed ones of the FFT values; and windowing circuitry adapted to apply windowing to a frame of the decompressed variably compressed ones of the FFT values, wherein the variably compressing is responsive to an amount of signal attenuation provided by the windowing.

12. The system of claim 11, and further including:

analog circuitry adapted to receive a set of analog signals; and analog-to-digital conversion (ADC) circuitry coupled to the analog circuitry and adapted to produce a plurality of digital samples corresponding to at least one analog signal in the set of analog signals.

13. The system of claim 12 wherein the FFT determining circuitry is coupled to the ADC circuitry.

14. The system of claim 13, wherein the FFT determining circuitry and the data compression circuitry comprise a processor.

15. The system of claim 14 wherein the processor is integrated in a same chip as the analog circuitry and the ADC circuitry.

16. The system of claim 14 wherein the processor is a general purpose processor.

17. The system of claim 12 and further including at least one antenna coupled to the analog circuitry.

18. The system of claim 12 and further including transmitter circuitry adapted to transmit a set of transmit signals, wherein the set of analog signals are responsive to the set of transmit signals.

19. The system of claim 11, further comprising:

analog front-end circuitry; and analog-to-digital conversion circuitry, wherein the fast Fourier transfer (FFT) determining circuitry, data compression circuitry, data decompression circuitry, windowing circuitry, the analog front-end circuitry, and the analog-to-digital conversion circuitry are integrated on a single semiconductor substrate.

20. The system of claim 11, wherein the data compression circuitry implements bit-resolution reduction from a first number of bits O to a second number of bits L, in which L is less than O, and in which the difference between O and L is based on a chirp index position within a frame of chirps.

* * * * *